United States Patent
Nagasubramaniam et al.

(10) Patent No.: US 9,722,856 B2
(45) Date of Patent: Aug. 1, 2017

(54) SYSTEM AND METHOD TO ORCHESTRATE AND CONTROL SEQUENCE OF RECOVERY ACTIONS FOR RESUMPTION OF BUSINESS SERVICES BY DYNAMICALLY CHANGING RECOVERY ACTION SEQUENCE BASED ON FEEDBACK RECEIVED FROM AGENT/OPEN FLOW BASED DEVICES CATERING TO BOTH TRADITIONAL AND SOFTWARE DEFINED NETWORKS

(71) Applicant: Tech Mahindra Ltd., Pune, Maharashtra (IN)

(72) Inventors: Sankarnarayanan Nagasubramaniam, Pune (IN); Manoj Kotnala, Pauri-Garhwal (IN); Sachin Ganpatlal Tawniya, Maharashtra (IN)

(73) Assignee: Tech Mahindra Ltd., Pune (IN)

( * ) Notice: Subject to any disclaimer, the term of this patent is extended or adjusted under 35 U.S.C. 154(b) by 0 days.

(21) Appl. No.: 14/856,650

(22) Filed: Sep. 17, 2015

(65) Prior Publication Data
US 2016/0085641 A1 Mar. 24, 2016

(30) Foreign Application Priority Data
Sep. 18, 2014 (IN) .......................... 2978/MUM/2014

(51) Int. Cl.
*H04L 12/24* (2006.01)

(52) U.S. Cl.
CPC ...... *H04L 41/0213* (2013.01); *H04L 41/0654* (2013.01)

(58) Field of Classification Search
CPC ............... G06F 11/203; G06F 11/3006; G06F 11/3409; G06F 2201/85; H04L 41/0213
See application file for complete search history.

(56) References Cited

U.S. PATENT DOCUMENTS

| | | | |
|---|---|---|---|
| 8,693,374 B1 * | 4/2014 | Murphy | H04L 12/28 370/255 |
| 9,432,267 B2 * | 8/2016 | Fall | G06F 9/45558 |
| 2013/0055010 A1 * | 2/2013 | Kotha | G06F 11/203 714/4.11 |
| 2013/0144973 A1 * | 6/2013 | Li | H04L 41/26 709/217 |
| 2014/0075557 A1 * | 3/2014 | Balabine | H04L 63/20 726/23 |
| 2015/0082088 A1 | 3/2015 | Nagasubramaniam et al. | |

(Continued)

*Primary Examiner* — Bryce Bonzo
*Assistant Examiner* — Jonathan Gibson
(74) *Attorney, Agent, or Firm* — Baker Hostetler LLP

(57) ABSTRACT

Disclosed is a system and method for enabling a SNMP based Network Management System in cooperation with at least one SDN Controller to control sequence of recovery actions and dynamically change the recovery action sequence for a given fault based on the feedback received from an SNMP Agent/Open flow based devices across various systems/platforms for recovering a business service which is achieved by way of Open flow stack enhancements and OF-CONFIG enhancements at the controller end and device end. The present invention is essentially about extending the ability to initiate and perform dynamic recovery actions in a network supporting both the traditional SNMP based management systems & Open flow based SDN Control.

13 Claims, 10 Drawing Sheets

(56) References Cited

U.S. PATENT DOCUMENTS

2015/0372902 A1\* 12/2015 Giorgetti ................ H04L 45/64
370/219
2016/0020939 A1\* 1/2016 Ramasubramanian H04L 41/0654
370/217

\* cited by examiner

SYSTEM AND METHOD TO ORCHESTRATE AND CONTROL SEQUENCE OF RECOVERY ACTIONS FOR RESUMPTION OF BUSINESS SERVICES BY DYNAMICALLY CHANGING RECOVERY ACTION SEQUENCE BASED ON FEEDBACK RECEIVED FROM AGENT/OPEN FLOW BASED DEVICES CATERING TO BOTH TRADITIONAL AND SOFTWARE DEFINED NETWORKS

REFERENCE TO RELATED APPLICATION

This application claims the priority of Indian Application No. 2978/MUM/2014, filed Sep. 18, 2014, the entire contents of which are incorporated herein by reference.

FIELD OF THE INVENTION

The present invention relates to a system and method for managing and initiating recovery actions for the business services based on faults received across multiple systems, elements and devices, and more particularly, the present invention relates to system and method of communication for enabling the Network Management System OR SDN Controller to correlate and control sequence of recovery actions to be performed with a view to resume the business service quickly for the faults encountered and also dynamically change the recovery action sequences based on the feedback received from the SNMP Agent OR from the open flow based systems/platforms/devices.

DEFINITIONS OF TERMS USED IN THE SPECIFICATION

The expression 'systems' used hereinafter in the specification refers to the systems/platforms/devices.

The expression 'SNMP' used hereinafter in the specification refers to the Simple Network Management Protocol.

The expression 'NMS' used hereinafter in the specification refers to the Network Management System.

The expression 'EMS' used hereinafter in the specification refers to the Element Management System.

The expression SDN used hereinafter in the specification refers to the expansion Software Defined Networks.

The expression SDN controller used hereinafter in the specification is a software entity that has exclusive control over an abstract set of data plane resources.

The expression 'OpenFlow' used hereinafter refers to the Open Flow protocol used as a mechanism to interact between a SDN Controller and any element/device supporting Open Flow interface. This protocol is primarily used by the SDN controller to add, update, and delete flow entries in the Flow Tables.

The expression 'OF-CONFIG' used hereinafter refers to OpenFlow Configuration and essentially is a Configuration and Management Protocol.

The expression 'Provider' used hereinafter in the specification refers to a Telecom/Internet Service Provider OR a Network equipment manufacturer.

The expression 'Business Service' used hereinafter in the specification refers to the services offered by any provider but is not limited to services related to only Telecom/Data Network.

The expression 'Big Data' used hereinafter in the specification refers to Big data analytics and essentially is a process of mining large data sets containing various data types which in this context are the data points collected from the operating network.

The expression E2E used hereinafter refers to end to end business scenario.

The above definitions are in addition to those expressed in the art.

BACKGROUND OF THE INVENTION

Network Management involves managing & monitoring of network devices. The management of the devices includes a module referred as Network Management System (NMS). The Network Management System interacts with an Agent Module running on the respective devices for managing the devices.

With the Proliferation of Network devices, the number of devices to be managed is growing tremendously. The business service working in such a network environment is typically realized based on a set of functionality that is orchestrated across various systems & platforms in the network. It is important to also realize that the network is also gradually changing into a SDN enabled environment. As a result of this, the business service working in such a network environment is realized based on a set of functionality that is orchestrated across both the traditional elements (which does not support SDN) & those elements that support SDN through Open Flow.

Typically, Network Management has been more focused on the monitoring of elements & the significance of recovery actions for business services in the case of problems/faults has been dealt in a manual manner wherein an Administrator tends to login manually across multiple systems & perform the action recovery sequence. Since the functioning of the business services is most important aspect for a Provider offering the service, it is more appropriate to have an automated/programmatic approach to the recovery of business services as opposed to the common practice of employing manual methods. Traditionally SNMP has been leveraged largely for network monitoring & more importantly the GET Operations are typically used to get the data with TRAPS being used for asynchronous notifications.

The SET operation has been typically used to perform configuration changes & set Value of the managed object. Actions resulting out of Traps were invariably performed outside the SNMP based elements OR in some cases by defining the OID as a part of MIB definition. While this approach has been in practice, there is a fundamental challenge in this approach with respect to taking recovery actions for business services for SNMP and Open flow based systems.

In this regard, it may be noted that the prior art solutions based on SNMP does not inherently support/have an ability to handle a managed transaction across multiple elements required for performing recovery actions.

Similarly OF-CONFIG 1.2 which defines the communication standard between an OpenFlow switch and an OpenFlow Configuration Point does not have specific aspects that are required for taking E2E recovery actions. OF-CONFIG 1.2 consists of a network management framework which supports BEEP protocol at the transport layer and supports the data structures based on YANG definition. It may also be noted that the key functionality for this is derived from NETCONF which has been in popular use only for configuration management.

It may be noted that as a part of SDN (Software Defined Network), the separation of data plane & control plane has been envisaged & Openflow happens to be one of the mechanisms defined by the standards body for realizing this separation. In an SDN network supported by Open flow the errors generated due to the packet treatment by the infrastructure elements such as switches and routers are passed onto the SDN Controller through the TCP connection. The Action sets defined for the errors encountered are used for performing various treatment on the flow related to the packet. Hence, all treatment related to Open flow is limited only to the flow control of a packet at the granular level & treatment of packet flow is done based on matching the headers/flow tables. However it is important to realize that in addition to the above, usually operational errors are typically detected/encountered at run time and these are typically rectified by the administrator only through manual intervention.

Besides, a northbound interface of the SDN Controller is currently yet to be standardized by the Openflow workgroup & hence the protocol specifications also currently prevent from E2E recovery initiated from Network management to an SDN Controller.

Further, as various types of network devices are brought under a Network management System, the set of recovery actions required for say restoring a business service or fault spans across multiple platforms, systems & devices. Essentially, restoration involves performing multiple set of recovery actions within/across multiple network devices. Besides, the actions could result in intermediate responses from the devices & hence the mechanism to change a course of action sequence in a dynamic manner in a programmatic way by the Management System is important. Hence there is a need for Management System OR an SDN controller to be able to instruct the recovery actions & correlate the outcome of such recovery action responses performed by various Agents running in the respective platforms/systems/devices.

U.S. patent application Ser. No. 14/485,099 of Tech Mahindra Ltd. discloses a process/method of communication for enabling the Network Management System to initiate, correlate & control the sequence of recovery actions for a given business scenario & dynamically change the recovery action sequence based on the feedback received from the SNMP Agent had been elaborated. However, as Networks move towards adopting SDN, it is important to realize that both SNMP & Openflow are likely to co-exist in the near future as Openflow along with companion protocol OF-CONFIG only specifies a management mechanism for Layer 2/3 devices such as switches/routers.

Since, the recovery of business services & scenarios would involve many types of network elements in addition to the Layer 2/3 switches & Routers, multiple protocols for management of the devices are expected to co-exist. For example SNMP Agents may be running in many devices other than switches & routers. Examples of such elements include a USSD gateway, SMS Gateway, P-CSCF, S-CSCF, I-CSCF etc in a typical IP Multimedia system. Similarly, in a typical streaming solution there would be many elements such as encoder, IPTV middleware, SetTopBox (STB) etc which typically support SNMP agents. It is important to realize that such networks would also have an IP backbone supporting management through Open flow (Separating the Data & Control Plane) & recovery of actions for a business scenario can span across all these diverse devices which effectively mean that Network Management System should be able to support mechanisms for initiating recovery actions to the Open flow supported elements such as Switches & Routers & also support the Traditional network elements supporting SNMP which is not available in the prior art.

Accordingly, there exists a need to provide a system and method for orchestrating dynamic recovery actions for business services across traditional and SDN supporting Openflow protocol.

ASPECTS OF THE DISCLOSURE

Some of the aspects of the present disclosure aimed to ameliorate one or more problems of the prior art or to at least provide a useful alternative are described herein below:

An aspect of the present disclosure is to programmatically perform & manage the sequence of typical recovery actions across both the traditional networks (supporting SNMP) as well as the Software Defined Networks.

Another aspect of the present disclosure is to provide a method for enabling the SNMP based Network Management System in cooperation with at least one SDN controller to control the sequence of recovery actions & dynamically change the recovery action sequence based on the feedback received from the Agent/Open flow based devices across various systems/platforms with a view to recover the business service.

Yet another aspect of the present disclosure is to provide a way for the open flow enabled elements to communicate list of supported recovery actions as a part of initialization mechanism.

Other aspects and advantages of the present disclosure will be more apparent from the following description when read in conjunction with the accompanying figures, which are not intended to limit the scope of the present invention.

SUMMARY OF THE INVENTION

Accordingly, the some embodiments in accordance with present disclosure provide a system and method for enabling a SNMP based Network Management System in cooperation with at least one SDN Controller to control sequence of recovery actions and dynamically change the recovery action sequence based on the feedback received from an Agent/Open flow based devices across various systems/platforms for recovering a business service. The system comprises a network management system (NMS) and at least one SDN controller.

The network management system (NMS) includes a graphical interface module (101) for provisioning of recovery action rules for the business service, an action recovery sequencer engine (102) capable of initiating recovery actions, an action definition repository (103) capable of storing of recovery actions in interaction with the action recovery sequence engine (102) and facilitating configuration of rules for the business service, wherein the action definition repository (103) includes a list of recovery actions based on active updates from an agent module indicating the recovery actions supported during initialization, and a stateful SDN Interface module (105) configured within the Network Management System for initiating and performing a list of recovery actions on behalf of the Network Management system.

At least one software defined network (SDN) controller is capable of receiving list of recovery action from the stateful SDN Interface Module based on a fault detected. The software defined network (SDN) includes an action mapper functional module (106) for enabling the SDN Controller to keep a logical correlation of actions initiated from the Network Management System, a recovery orchestration engine (107) capable of receiving logical correlation of actions from the action mapper functional module (106) and enabling orchestration of atomic recovery actions by actively interacting with predefined Open flow stack enhancements (112) and predefined OF-CONFIG enhancements (110), wherein the open flow stack enhancements (112) and OF-CONFIG enhancements (110) at the SDN controller enables element/device interaction with an open flow based elements stack enhancements (113) and OF-CONFIG enhancements (111) at the device/element end, andan unified asynchronous notification handler (108) capable of enabling alarms/errors to be sent to the North bound systems through the stateful SDN Interface Module (105) at the Network Management System, an Analytics and data mining engine (114)(Commonly referred asBig Data Analytics) in the SDN controller for effectively interpreting the various data types with real time updates to the Topologyand Multi TenantManager and Recovery Orchestration Engine (107).

The present invention will now be described with the help of accompanying drawings, in which:

BRIEF DESCRIPTION OF THE ACCOMPANYING DRAWINGS

FIG. 1 illustrates a block diagram of a system for enabling a SNMP based Network Management System in cooperation with at least one SDN Controller to control sequence of recovery actions and dynamically change the recovery action sequence based on the feedback received from an Agent/Open flow based devices across various systems/platforms for recovering a business service, in accordance with the present invention;

Figure 3:
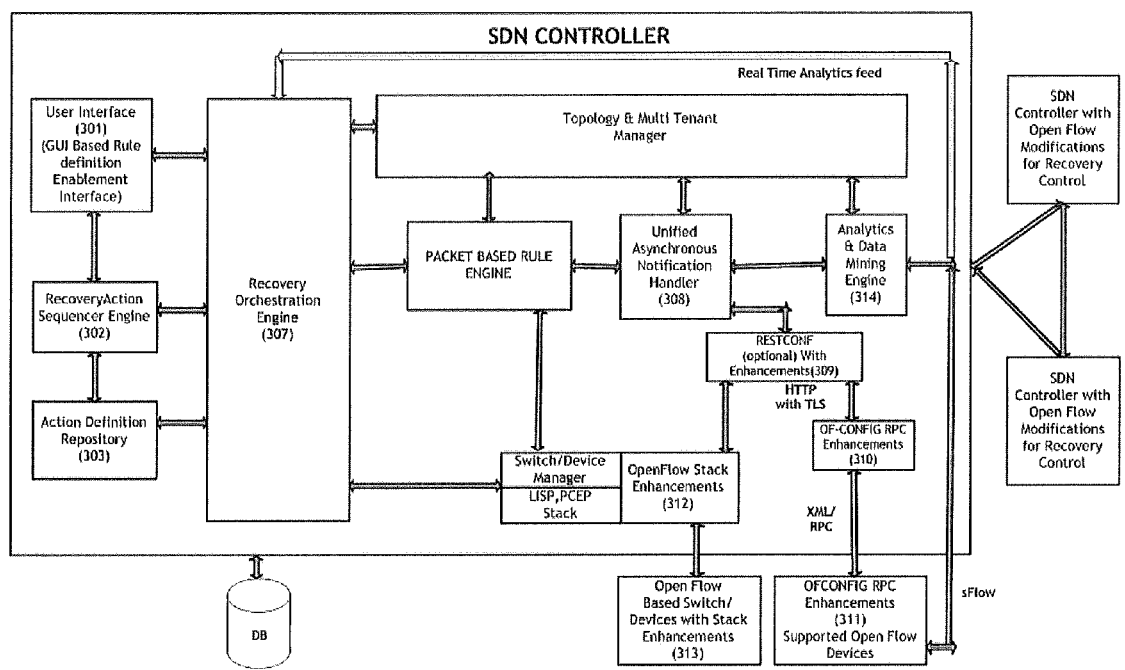
Figure 4:
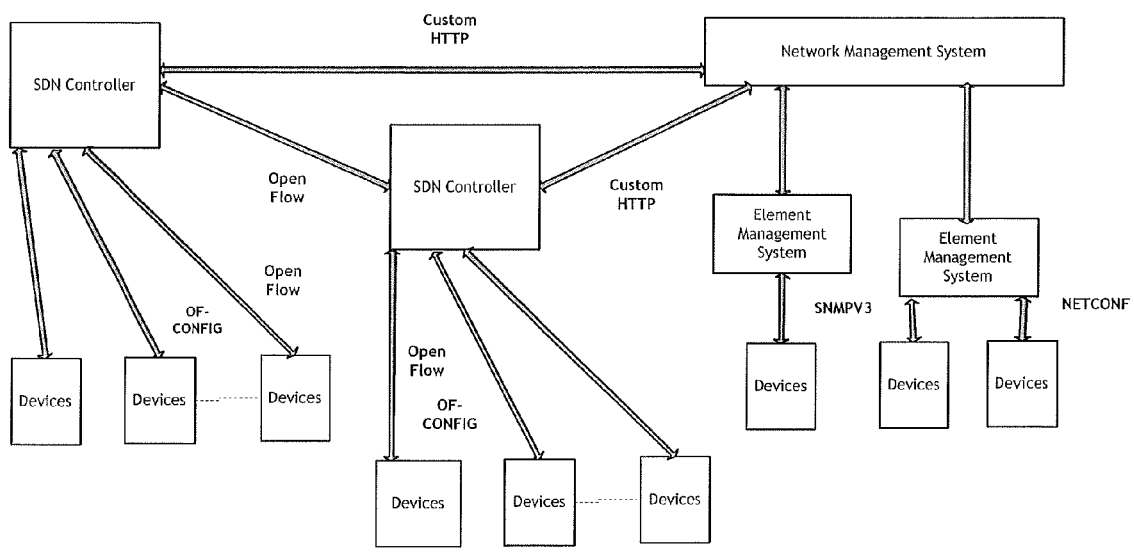
Figure 5:
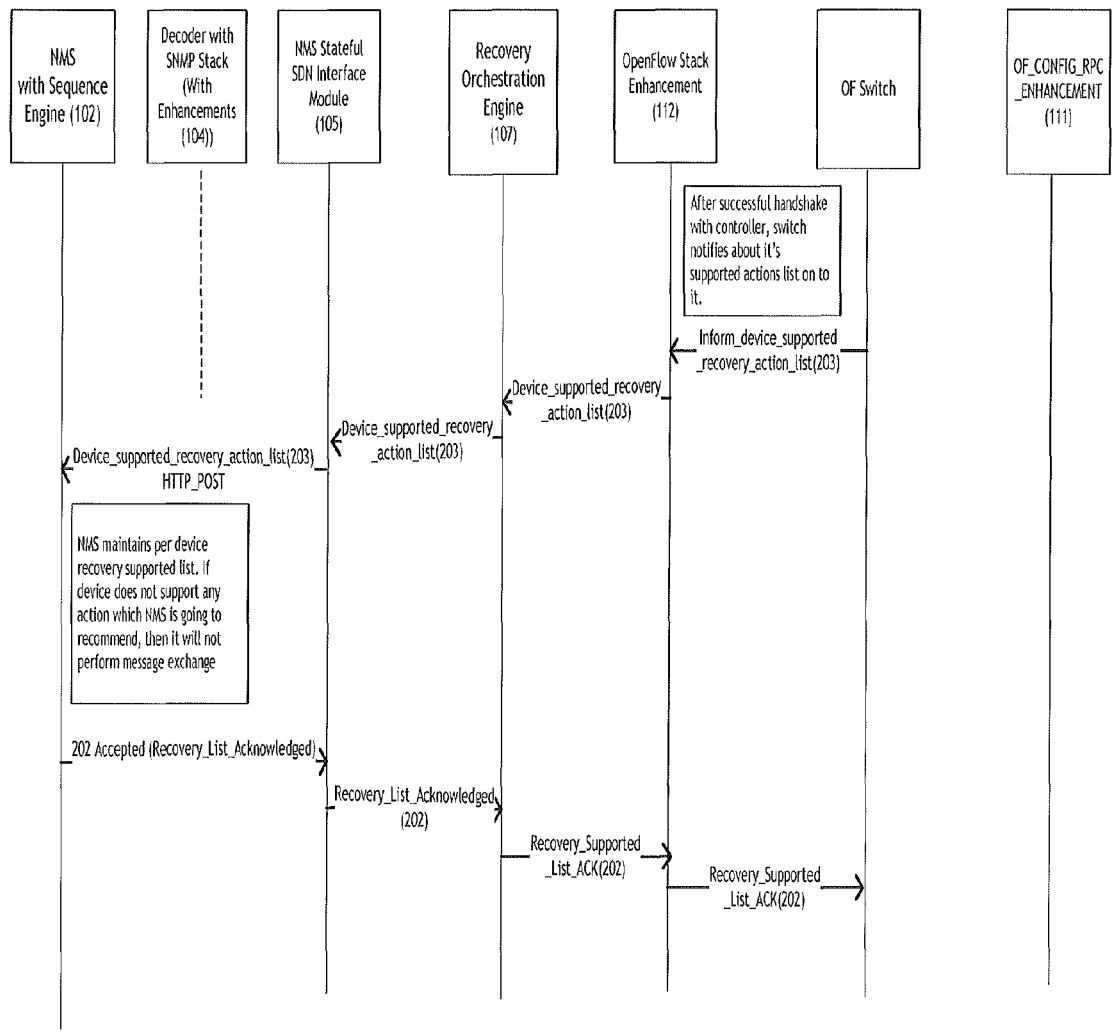

FIG. 3 an integrated SDN controller for directly correlating and controlling sequence of recovery actions to be performed based on the fault received and dynamically change the recovery action sequence of the fault, in accordance with an embodiment of the present invention;

FIG. 4 is an extension of FIG. 3 to bring out the key elements involved for both traditional SNMP based network as well as Software Defined Networks; and FIG. 5 illustrates initialization steps for the open flow elements.

DETAILED DESCRIPTION OF THE ACCOMPANYING DRAWINGS

A preferred embodiment will now be described in detail with reference to the accompanying drawings. The preferred embodiment does not limit the scope and ambit of the invention. The description provided is purely by way of example and illustration.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The present application incorporates by reference the contents of the patent application 2965/MUM/2013, titled 'System and Method for Taking Sequence of Dynamic Recovery' Actions.

The present invention provides an automated mechanism to carry out the recovery actions in an End to End manner with a view to have the business service up and resuming quickly in the event of faults across both traditional set of elements supporting SNMP as well elements supporting Open Flow.

Specifically, the present invention provides an optimized mechanism for initiating a recovery actions for a given business service either from a Network management system OR from an SDN Controller or combination thereof across varied set of elements/devices.

Generally, failure recovery in Software Defined Networks (SDN) has 2 important aspects. They are detailed in the following section below.

The Open Flow standard tries to address restoration/protection by actually enforcing aSDN controller to redirect flows one by one as a part of restoration procedure in case of failures related to packet flow. In this context it may be noted that there have been multiple improvements/alternate algorithms as well that have been suggested in the public domain to improve the recovery times in the case of failures related to packet flow.

The present invention addresses recovery actions leading to the recovery of a business service at a higher abstraction & does not address the above referred issue.

Essentially what this implies is explained further below. Typically at run time, open flow based elements as well as SNMP based elements could have various faults detected. For example in the case of Open Flow based elements there could have an error/fault such as "TCAM related error" encountered during run time. In order to overcome such errors supported recovery actions are typically to be initiated in single/multiple steps based on the operation performed which are primarily management related recovery operations. Typically, this is related to Administering/management operation on specific characteristics of TCAM with a view to recover the fault. This involves granular set of actions & multiple Intermediate responses to be treated in a seamless discrete manner with a view to programmatically initiate/change a set of recovery actions during the course of correcting the fault/error. For example, in the case of encountering a TCAM based error, appropriate recovery steps as outlined in FIG. 2 could be initiated.

Based on the above, it may thus be inferred that the following aspects described in detail will help/aid in bringing an E2E methodology for performing a recovery action in the context of Openflow based SDN network. In order to perform such a recovery action for a business scenario the following 3 aspects are envisaged.

Ability to, support a mechanism to dynamically change the course of recovery action through suitable enhancements as explained in the embodiments of this invention.

Ability for Centralized system such as Network Management System to instruct the SDN Controller for configuration aspects covering both the OF-CONFIG as well as the aspects of configuration related to Open flow. This effectively implies that a set of continuous actions commands constituting to one service operation need to be enabled/issued & results correlated through a programmatic approach.

Ability to enhance/add new message types for both asynchronous alarm messages and message types for conveying alarms with an ACK based mechanism including specific message types for initiating the recovery actions.

Figure 1:
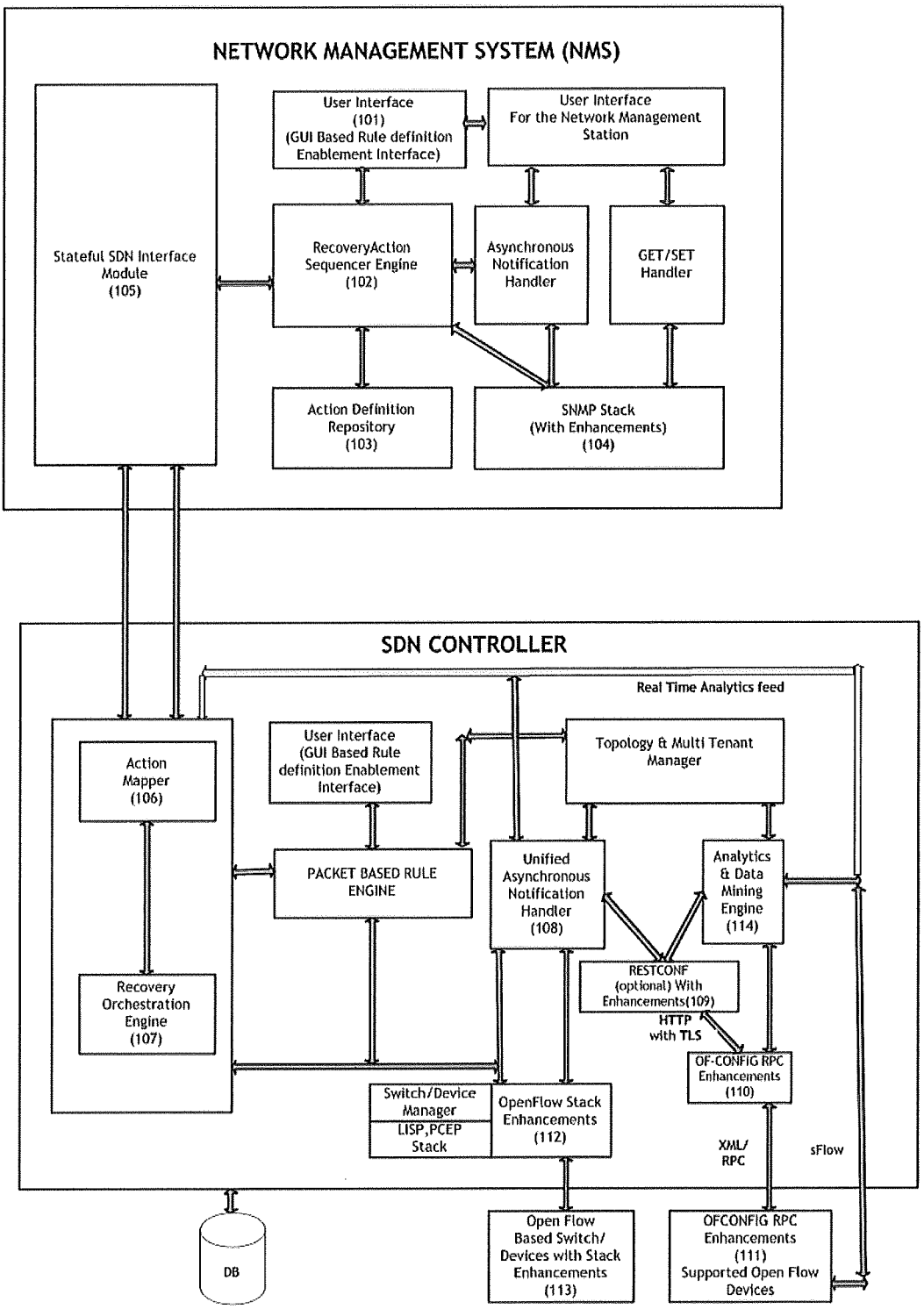

Following are the Key Criteria's for enabling End to End Recovery Actions:

An E2E mechanism to initiate recovery of actions across both traditional network supporting SNMP & Open flow based SDN elements Ability to apply the recovery action rules OR change the recovery action sequence based on real time analytics data received and update the action repository Enhancements to proposed Open Flow 1.4/OF-CONFIG specifications to deal with specific aspects related to Recovery Actions based on the faults received An ability for the Network management System to dynamically change the action sequence to the SDN Controller during the course of recovery Referring now to FIG. 1, there is shown a block diagram for a system (100) for enabling aSNMP based Network Management System in cooperation with at least one SDN Controller to control sequence of recovery actions and dynamically change the recovery action sequence based on the feedback received from an Agent/Open flow based devices across various systems/platforms for recovering a business service.

The system comprises a network management system (NMS). The network management system (NMS) includes a graphical interface module (101) for provisioning of recovery action rules for the business service.

Further, the network management system (NMS) includes an action recovery sequencer engine (102) capable of initiating recovery actions.

Furthermore, the system includes an action definition repository (103) capable of storing of recovery actions in interaction with the action recovery sequence engine (102) and facilitating configuration of rules for the business service, wherein the action definition repository (103) includesa list of recovery actionsbased on active updates from an agent module indicating the recovery actions supported during initialization.

The system (100) is characterized in that the system includes a Stateful SDN Interface module (105) configured within the Network Management System for initiating a list of recovery actions.

The system (100) further characterized by at least one a software defined network (SDN) controller. The at least one SDN controller is capable of receiving list of recovery action from the Stateful SDN Interface module based on a fault detected. The software defined network (SDN) controller includes an action mapper functional module (106) for enabling the SDN Controller to keep a logical correlation of actions initiated from the Network Management System.

Further, the SDN controller includes a recovery orchestration engine (107) capable of receiving logical correlation of actions from the action mapper functional module (106) and enabling orchestration of automatic recovery actions by actively interacting with any one of predefined Open flow stack enhancements (112) and predefined OF-CONFIG enhancements (110). The open flow stack enhancements (112) and OF-CONFIG enhancements (110) at the SDN controller enables element/device interaction with an open flow based elements stack enhancements (113) and OF-CONFIG enhancements (111) at the device/element end Furthermore the SDN Controller includes an Analytics and data mining engine (114) in the SDN controller for effectively interpreting the data received in real time from the various devices & performing real time updates to the Topology & Multi TenantManager and Recovery Orchestration Engine (107). The Recovery Orchestration Engine (107) could then decide the final actions based on both on the real time analytics feed received from Analytics and Data Mining Engine (114).

Furthermore, the SDN controller includes an unified asynchronous notification handler (108) capable of enabling alarms/errors to be sent to North bound systems through the Stateful SDN Interface module (105) at the Network Management System.

The software defined network (SDN) controller optionally includes a REST based interface for providing notifications. Specifically, the open flow enabled elements communicate a list of supported recovery actions as a part of initialization mechanism.

The section below illustrates a current Protocol data unit (PDU) structure of the Open Flow based Operation & also brings out the suggested PDU structure for this enhanced Open Flow operation Open Flow Changes OpenFlow protocol currently supports only the following message types:

Controller-to-switch messages: which are initiated by the SDN controller and may or may not require a response from the switch.

Switches send asynchronous messages to controllers to denote a packet arrival, switch state change, or error & there are four main asynchronous message types Symmetric messages are sent without solicitation, in either direction. (Example: Echo message for confirming that the connection is alive)

The configuration aspects are addressed by both Openflow& OF-CONFIG 1.2. The OF-CONFIG protocol deals with configuration related to the switch while the openflow provides certain configuration options for the packet flow The predefined Open flow stack enhancements for initiatingand performing the end to end recovery actions for a given fault comprises following enhancements New Message type for indicating the Alarm information (OFPT_ALARM_STATUS);

New Message Type for indicating recovery support (OFPT_SUPPORTED_RECOVERY_ACTION);

New Message Type for initiating recovery action (OFPT_SET_RECOVERY_ACTION);

New Message Type for initializing recovery action (OFPT_DEVICE_SUPPORT_ACTION);

Inclusion of set of recovery action map (enumofp_recovery_action_map);

A first set of additional Structure for detecting faults (structofp_fault_detection_send);

A second set of additional Structure for acknowledging the faults (structofplault_capabilities_ack); and combination thereof are used for initiating & performing the end to end recovery actions for a given fault The details of the additions with respect to Openflow are highlighted in Grey in the below section for easy reference.

```
enumofp_type {
  /* Immutable messages. */
  OFPT_HELLO = 0, /* Symmetric message */
  OFPT_ERROR = 1, /* Symmetric message */
  OFPT_ECHO_REQUEST = 2, /* Symmetric message */
  OFPT_ECHO_REPLY = 3, /* Symmetric message */
  OFPT_EXPERIMENTER = 4, /* Symmetric message */
  /* Switch configuration messages. */
  OFPT_FEATURES_REQUEST = 5, /* Controller/switch message */
  OFPT_FEATURES_REPLY = 6, /* Controller/switch message */
  OFPT_GET_CONFIG_REQUEST = 7, /* Controller/switch message */
  OFPT_GET_CONFIG_REPLY = 8, /* Controller/switch message */
  OFPT_SET_CONFIG = 9, /* Controller/switch message */
  /* Asynchronous messages. */
  OFPT_PACKET_IN = 10, /* Async message */
  OFPT_FLOW_REMOVED = 11, /* Async message */
  OFPT_PORT_STATUS = 12, /* Async message */
  /* Controller command messages. */
  OFPT_PACKET_OUT = 13, /* Controller/switch message */
  OFPT_FLOW_MOD = 14, /* Controller/switch message */
  OFPT_GROUP_MOD = 15, /* Controller/switch message */
  OFPT_PORT_MOD = 16, /* Controller/switch message */
  OFPT_TABLE_MOD = 17, /* Controller/switch message */
  /* Multipart messages. */
  OFPT_MULTIPART_REQUEST = 18, /* Controller/switch message */
  OFPT_MULTIPART_REPLY = 19, /* Controller/switch message */
  /* Barrier messages. */
  OFPT_BARRIER_REQUEST = 20, /* Controller/switch message */
  OFPT_BARRIER_REPLY = 21, /* Controller/switch message */
  /* Controller role change request messages. */
  OFPT_ROLE_REQUEST = 24, /* Controller/switch message */
  OFPT_ROLE_REPLY = 25, /* Controller/switch message */
  /* Asynchronous message configuration. */
  OFPT_GET_ASYNC_REQUEST = 26, /* Controller/switch message */
  OFPT_GET_ASYNC_REPLY = 27, /* Controller/switch message */
  OFPT_SET_ASYNC = 28, /* Controller/switch message */
  /* Meters and rate limiters configuration messages. */
  OFPT_METER_MOD = 29, /* Controller/switch message */
  /* Controller role change event messages. */
  OFPT_ROLE_STATUS = 30, /* Async message */
  /* Asynchronous messages. */
  OFPT_TABLE_STATUS = 31, /* Async message */
  /* Request forwarding by the switch. */
  OFPT_REQUESTFORWARD = 32, /* Async message */
  /* Bundle operations (multiple messages as a single operation). */
  OFPT_BUNDLE_CONTROL = 33,
  OFPT_BUNDLE_ADD_MESSAGE = 34,
  /* Start of Additions related to recovery action. */
  OFPT_ALARM_STATUS = 200,              //Openflow extension recommended
  OFPT_SUPPORTED_RECOVERY_ACTION = 201,    //Openflow extension recommended
  OFPT_SET_RECOVERY_ACTION = 202,          //Openflow extension recommended
  OFPT_DEVICE_SUPPORT_ACTION = 203,     //Openflow extension recommended
}
/* Recovery Action Structure in 1.4 */
enumofp_recovery_action_map {
  OFRAM_RECOVER_TCAM_REINIT = 3, /*recover from TCAM Error
by reinitializing buffer */
  OFRAM_RECOVER_TCAM_RESET_BUFFER = 4,   /*recover TCAM Error by reset size */
  OFRAM_RECOVER_IP_INCONS = 5, //IP Conf
  OFRAM_RECOVER_PKT_LOSS_IN_STREAM = 6, //Packet Loss in Streaming
  OFRAM_RECOVER_JITTER_BUFFER = 7, //Jitter Buffer
  OFRAM_RECOVER_IGMP_SNOOPING_REINIT = 8
  /*
  More to be added .....
  */
};
/* configuration. */
structofp_fault_detection_send {
  structofp_header header;
  fault_conditionsfaultid; /*one of the fault generated at device */
  uint32_ttransactionid; /*session to retain the status of fault and recovery */
};
structofp_fault_capabilities_ack {
  structofp_header header;
  fault_conditionsfaultid; /*one of the fault generated at device */
  uint8_t is_recoverable; /* to indicate the device, whether recovery is possible or not */
};
structofp_fault_recovery_command {
  structofp_header header;
  fault_conditionsfaultid; /*one of the fault generated at device */
  uint32_ttransactionid; /*session to retain the status of fault and recovery */
  recovery_action_maprecovery_action; /*controller recommending recovery action and device refer the map to recover with action */
  uint8_t recovery_status; /*success or failure with boolean flags */
  uint8_t recovery_action_completed; /*indicates whether recovery is successful or is in progress */
};
/ * End of additions related to recovery action. */
```

The rationale behind the changes proposed is elaborated in the following sections.

Notifications have 2 parts in SDN context. There are identified set of notifications from Open Flow Protocol and there are notifications from companion protocol called OF-CONFIG which is based on NETCONF (as recommended to be used by the standards body). The set of notifications supported by each of the protocols are covered in "Of-notifications-framework-1.0.pdf". However, the specifications do not address limitation in providing a managed transaction for performing recovery actions across different set of elements which is elaborated below. Hence, it is important to realize that the prior art solution related to SDN is more focused on forwarding traffic and reconfiguration issues & does not consider to a large extent the fault management aspects of the control plane Besides, Inherently OF_Config (based on NETCONF) subscribe/notify method for notifications is not helpful in initiating a Automatic recovery action for a given fault as correlation of Request/multiple intermediate responses are expected to be handled & OF-CONFIG cannot handle in a clean way of correlation of multiple intermediate responses for a given recovery action which is needed. Besides, the underlying mechanism of NETCONF as recommended by the standards body has been primarily used only for Configuration purpose.

Hence enhancements to Open Flow Protocol for "Recovery action" & "Alarm Notifications" & has been suggested because of 4 important reasons outlined below.

1. The first reason is Open Flow stacks at the devices directly operate on low level abstractions of the hardware/ASIC. Hence, detection of alarms from the lowest abstraction layer can reach out through OpenFlow so that a recovery action can be initiated from the same TCP based interface which means would be faster & more effective. It is also important to realize that the most common errors/faults detected (such as TCAM error) at run time get generated at the lower level abstraction layers of the device.

2. Secondly, for a typical business scenario recovery actions can span across multiple actions which means there could be actions related to "Flow Control" as well which means the bulk of recovery actions (excluding those related to OF-Config/Configuration) can be handled by the same interface (Open Flow)

3. Thirdly, Changes suggested on the open flow with respect to performing recovery actions with a view to bring up the business service can also be applied in an Open flow based SDN environment comprising of multiple controllers as the controllers as per definition support open flow as an interface to interact with other controllers which can be leveraged & used for also performing recovery of services by interacting among the controllers through the proposed minimum enhancements as Outlined in the invention for carrying out the recovery actions. This would also avoid additional interface for such a crucial function such as recovery of a business service.

4. Fourthly, and most importantly SDN is more focused on forwarding traffic and reconfiguration issues &it does not consider to a large extent the fault management aspects of the control plane The key limitations of Open flow 1.4 as per specifications are summarized below Fault recovery & initiating a sequence of recovery actions based on the faults detected at run time.

It may be noted that out of key element management functions such as performance monitoring, device monitoring are currently not supported in Open flow specifications 1.4

The recovery actions covering Open flow based supported elements in accordance with the present invention are elaborated with a detailed flow using FIG. 2,2a,2b,2c,2d,2e. However, the key additions with respect to the invention are detailed below.

- Realization of a stateful SDN Interface module which manages the transaction and also invokes a custom enhanced HTTP based mechanism from the Network Management System to the SDN Controller to instruct the commencement of the Recovery Action. It may be noted that the North Bound Interface from the SDN Controller is not defined yet by the Open Flow Specifications. The message request from the Network Management System proposed is based on hypertext transfer protocol (HTTP). The HTTP message request envelope typically includes a header and a body. In one embodiment, the header of the message request can include a special type qualifier to indicate that multiple responses are expected.
- Initiation of Recovery action by sending a Request Operation to the SDN Controller effectively mapping the Correlation Identifier, Action qualifier with the Open flow parameter referred as "xid" as per Open Flow 1.4 Specifications
- Invocation of a custom enhanced HTTP based mechanism from the SDN Controller to the Network Management to instruct the Completion of the Recovery Action by correlating the intermediate responses.
- Invocation of a HTTP from the Network Management to the SDN Controller to dynamically change the action sequence to the SDN Controller.
- Enhancements to the OF-CONFIG 1.2 Protocol which is used as a companion protocol to Open Flow for the Configuration and management.
- Enhancements to the Open Flow Protocol for initiating the recovery as outlined in the description for FIG. 2

Specifically, end to end recovery actions are initiated and performed from the Network Management System to at least one SDN Controllers, Element Management Systems and devices across SNMPV3, NETCONF, OF-CONFIG and OPEN FLOW based elements through a programmatic manner. The section below illustrates the suggested custom HTTP based Northbound Interface for performing recovery actions.

Custom HTTP Based Northbound Interface for Performing Recovery Actions

It is important to realize that the prior art has not defined yet an explicit interface between the Network Management System & SDN Controller for performing any recovery actions and hence poses a limitation in terms of initiating recovery actions through a programmatic manner. In order to achieve this objective a stateful SDN interface module[105] has been introduced in the Network Management System.

Since, the need for recovery action involves handling multiple intermediate responses and correlation of a recovery transaction, the HTTP headers have been modified. The updates related to these modifications are highlighted separately in Grey. The interface definition for this is fully elaborated below. It may be noted that REST based mechanism would not support a stateful transaction based model and hence suitable modifications to the HTTP Header has been suggested for performing the recovery actions.

The interface definition for this is fully elaborated below. Besides HTTP extensions required for this is also highlighted separately in Grey.

---

Start of Alarm Notification from Controller To NMS

POST /informAlarm.html HTTP/1.1\r\n
   Request Method: POST
   Request URI: /informAlarm.html
   Request Version: HTTP/1.1
   Host: www.controller.com\r\n
     origin : www.switch.com
   User-Agent: Controller/1.4 \r\n
   Accept: application/json\r\n
   Accept-Language: en-us,en;q =0.5\r\n
   Accept-Encoding: gzip,deflate\r\n
   Accept-Charset: ISO-8859-1,utf-8;q=0.7,*;q=0.7\r\n
   Keep-Alive: 300\r\n
   Connection: keep-alive\r\n
   {
   OFHeader: {
     Version: 1.4,
     Type:200,      //Openflow extension needed
     XID:532121,
     Desc: "Message Length to be consumed by controller"
   },
   OFPayload: {
     FaultID : 1001 //OpenFlow Extension Needed For alarm generation
   }
}

---

Acceptance of Alarm Notification from NMS to Controller

HTTP/1.1 202 Accepted\r\n
   Request Version: HTTP/1.1
   Status Code: 202
   Response Phrase: Accepted
   Date: Thu, 13 May 2004 10:17:12 GMT\r\n
   Server: Apache\r\n
   Last-Modified: Tue, 20 Apr 2004 13:17:00 GMT\r\n
ETag: "9a01a-4696-7e354b00"\r\n
   Accept-Ranges: bytes\r\n
   Content-Length: <someLength>\r\n
   Connection: Keep-Alive\r\n
   Content-Type: application/json\r\n
   {
     OFHeader: {
       Version: 1.4,
       Type:201,      //Our new addition to OFP_TYPE, OF extn needed
       XID:532121,
       Desc: "Message Length to be Determined by controller"
     },

```
        OFPayload: {
              Action: "True"          //Further action is
required for recovering the fault
              }
        }
```

Initiation of Recovery Action Suggested by NMS to Controller

```
POST /setAction.html HTTP/1.1\r\n
  Request Method: POST
  Request URI: /setAction.html
  Request Version: HTTP/1.1
     Host: www.switch.com\r\n
        origin: www.controller.com\r\n
     User-Agent: Controller/1.4\r\n
     Accept: application/json\r\n
     Accept-Language: en-us,en;q=0.5\r\n
     Accept-Encoding: gzip,deflate\r\n
     Accept-Charset: ISO-8859-1,utf-8;q=0.7,*;q=0.7\r\n
     Keep-Alive: 300\r\n
     Connection: keep-alive\r\n
        X-MultiResponse : False \r\n
        X-SessionID : 532124 \r\n
        {
        OFHeader: {
           Version:1.4,
           Type:202,                  //
           XID:532124,
           Desc: "Message Length to be consumed by controller"
        },
        OFPayload: {
              FaultID : 1001, //OpenFlow Extension Needed For
alarm generation
                 TID : 532121, //Fault Generated by the XID in old
requests for mapping
                    RecoveryAction : 6        //ENUM suggesting the
recovery action on switch/device.
              }
        }
```

Acceptance of Recovery Action from Controller To NMS

```
     HTTP/1.1 202 Accepted\r\n
     Request Version: HTTP/1.1
     Status Code: 202
     Response Phrase: Accepted
     Date: Thu, 13 May 2004 10:17:12 GMT\r\n
     Server: Apache\r\n
     Last-Modified: Tue, 20 Apr 2004 13:17:00 GMT\r\n
     ETag: "9a01a-4696-7e354b00"\r\n
     Accept-Ranges: bytes\r\n
     Content-Length: <someLength>\r\n
     Connection: Keep-Alive\r\n
     Content-Type: application/json\r\n
     X-MultiResponse : False \r\n
     X-SessionID : 532124 \r\n
     {
        OFHeader: {
           Version:1.4,
           Type:203,              //new addition to OFP_TYPE
           XID:532124,
           Desc: "Message Length to be Determined by controller"
        },
        OFPayload: {
              Action: "True"          //Further action is
supported for recovering the fault
              }
        }
```

Status/Result of Recovery Action from Switch To Controller

```
POST /informAlarm.html HTTP/1.1\r\n
  Request Method: POST
  Request URI: /informAlarm.html
  Request Version: HTTP/1.1
  Host: www.controller.com\r\n
  Host: www.switch.com\r\n
     User-Agent: Controller/1.4 \r\n
     Accept: application/json\r\n
     Accept-Language: en-us,en;q=0.5\r\n
     Accept-Encoding: gzip,deflate\r\n
     Accept-Charset: ISO-8859-1,utf-8;q=0.7,*;q=0.7\r\n
     Keep-Alive: 300\r\n
     Connection: keep-alive\r\n
        X-MultiResponse : True \r\n
        X-SessionID : 532126 \r\n
        {
        OFHeader: {
           Version: 1.4,
           Type:200,
           XID:532126,
           Desc: "Message Length to be consumed by controller"
        },
        OFPayload: {
              FaultID : 1001, //OpenFlow Extension Needed For
alarm generation
                 TID : 532121, //Fault Generated by the XID in old
requests for mapping
                    RecoveryActionResul : True ,       //ENUM
suggesting the recovery action on switch/device.
                       EDM_Indicator : False          //More reponses
will be sent to controller
              }
        }
```

Final result of Recovery Action from Controller to NMS

```
POST /informAlarm.html HTTP/1.1\r\n
  Request Method: POST
  Request URI: /informAlarm.html
  Request Version: HTTP/1.1
  Host: www.controller.com\r\n
  Origin: www.switch.com\r\n
  User-Agent: Controller/1.4 \r\n
     Accept: application/json\r\n
     Accept-Language: en-us,en;q=0.5\r\n
     Accept-Encoding: gzip,deflate\r\n
     Accept-Charset: 150-8859-1,utf-8;q=0.7,*;q=0.7\r\n
     Keep-Alive: 300\r\n
     Connection: keep-alive\r\n
        X-MultiResponse : True \r\n
        X-SessionID : 532127 \r\n
        {
        OFHeader: {
           Version: 1.4,
           Type:200,
           XID:532127,
           Desc: "Message Length to be consumed by controller"
        },
        OFPayload: {
              FaultID : 1001, //OpenFlow Extension Needed For
alarm generation
                 TID : 532121, //Fault Generated by the XID in old
requests for mapping
                    RecoveryActionResult : True ,//ENUM suggesting the
recovery action on switch/device.
                       EDM Indicator: True          //More Reponses
will be sent to controller
              }
        }
```

The section below illustrates the suggested changes to OF-CONFIG

OF-Config Changes

In addition to the proposed changes on Open Flow for specific recovery actions there is be a need to also issue OF-Config related operations for achieving the objectives of E2E recovery. In this regard the following section details the role of OF-Config protocol & proposed enhancements.

The Configuration and management protocol used in the context of Openflow is referred to as OF-CONFIG and is a companion protocol to OpenFlow. The OpenFlow Configuration Protocol (OF-CONFIG) enables the remote configuration of OpenFlowdatapaths. OF-CONFIG essentially has been developed with the principle to keep the protocol and schema simple and leverage existing protocols such as NETCONF and schema models such as YANG definitions wherever possible. Primarily OF-CONFIG is currently applicable for performing the following operations.

Assignment of one or more OpenFlow controllers

Configuration of queues and ports

Ability to remotely change some aspects of ports (e.g. up/down)

It is important to realize that NETCONF protocol operations are realized as remote procedure calls (RPCs). As a higher level of abstraction REST based interface referred as RESTCONF has also been made available. Typically the data is encoded with either XML OR or JSON. Data-model specific protocol operations defined with the YANG "rpc" statement are invoked with the POST method.

Since E2E action recovery can involve elements supporting NETCONF as well it is important to correlate the asynchronous intermediate responses for a given fault based on the intermediate recovery action initiated and also enable dynamically to change sequence of action when required. Since the JSON RPC specifications currently do not address this explicitly, the present invention suggest a way to overcome the limitation with the following enhancement. The following section is an extract of the subset of the specification (JSON-RPC 2.0 Specification) of the response object from JSON specification & the corresponding additions are highlighted in Grey.

Given below is an extract of the subset of the specification (JSON-RPC 2.0 Specification) of the response object from JSON specification & the corresponding additions are highlighted in Grey.

---

Response object
When arpc call is made, the Server MUST reply with a Response, except for in the case of Notifications.
The Response is expressed as a single JSON Object, with the following members:
jsonrpc
A String specifying the version of the JSON-RPC protocol.MUST be exactly "2.0".
result
This member is REQUIRED on success.
This member MUST NOT exist if there was an error invoking the method.
The value of this member is determined by the method invoked on the Server.
error
This member is REQUIRED on error.
This member MUST NOT exist if there was no error triggered during invocation.
The value for this member MUST be an Object as defined in section 5.1.
id
This member is REQUIRED.
It MUST be the same as the value of the id member in the Request Object.
If there was an error in detecting the id in the Request object (e.g. Parse error/Invalid Request), it MUST be Null.
Corelation_ xid
This member is OPTIONAL and applicable for aspects related to recovery actions.. The value SHOULD normally not be Null and Numbers SHOULD NOT contain fractional parts. It would be an extension to JSON-RPC 2.0 to keep a track of requested/responded transactions with respect to retain a session on either end. It SHOULD be used to maintain single request multiple intermediate responses.
Either the result member or error member MUST be included, but both members MUST NOT be included.
Given below is the example for the RPC method.
--> {"jsonrpc": "2.0", "method": "informAlarm ", "params": , "id": 1, "Corelation_xid": 521221}
<-- {"jsonrpc": "2.0", "result": {Payload: {Action: "True"}}, "id": 1, "Corelation_xid": 521221}

---

-continued

<-- {"jsonrpc": "2.0", "result": {Payload: {Action: "True"}}, "id": 1, "Corelation_xid": 521221
.
.
.

---

The additions/enhancements helps in seamlessly able to correlate explicitly the intermediate responses which is required in the Context of recovery actions which otherwise is not facilitated by the prior art as per the current specifications.

Figure 2:
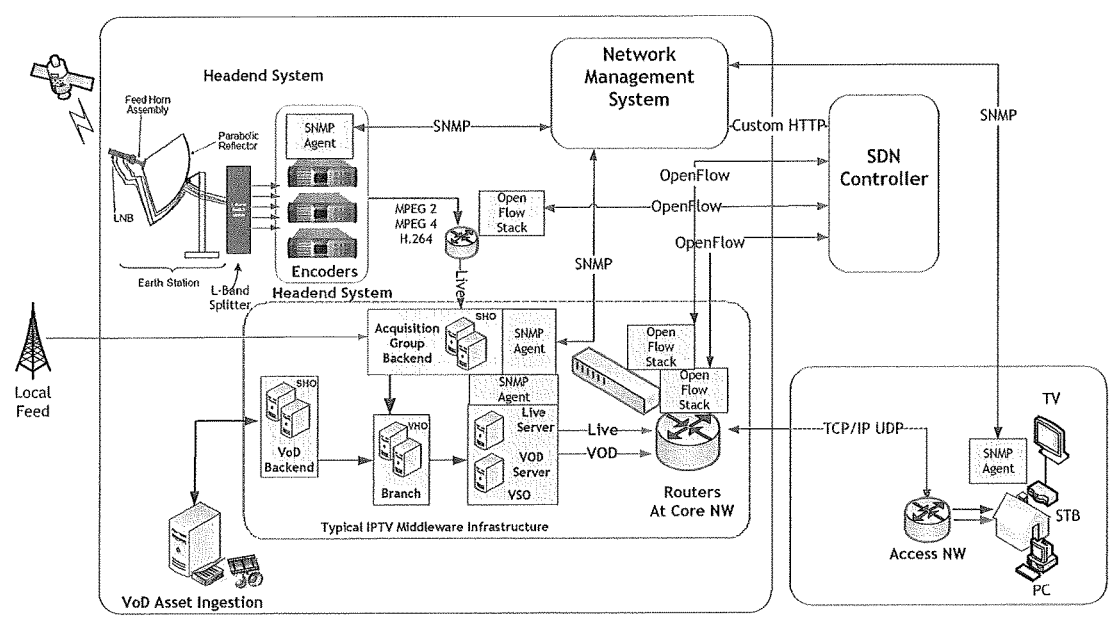
FIG. 2 illustrates a context of the use case scenario with an example environment.

FIG. 2 illustrates the context of the use case scenario with an example environment.

Furthermore, the examples described herein are intended to aid in understanding the principles of the invention, and are to be construed as being without limitation to such specially elaborated examples and conditions. As a result, the invention is not limited to the specific embodiments or examples described below.

Consider an example of a typical streaming service. The typical realization of this service involves a wide variety of system elements as depicted below in FIG. 2a. While switches/Infrastructure elements could be Open flow enabled for the management aspects, the traditional devices support management through SNMP/CLI/NETCONF based interfaces. Essentially the Network Management System consolidates the FCAPS operations in the traditional world & there is a legacy set of Network Management systems which are currently operational & is expected to serve for some more time to leverage the existing investments made.

Now let us say that there is an Alarm in Open Flow based elements OR a Trap generated by the respective elements. The Network Management System captures all the alarms generated by respective elements& identifies the business scenario as "Inability to establish Session".

The Network management system identifies the list of recovery actions that need to be initiated & the same is sent to the respective elements in a sequential manner. This implies that the Network management would also interface with the SDN Controller for initiating a request & share the instructions leading to recovery.

The list of key steps is elaborated below.

Figure 2A:
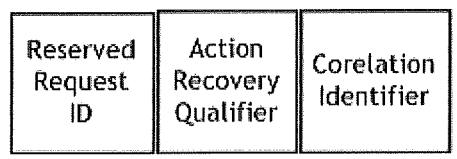
FIG. 2a illustrates additions with respect to the SNMP V3 Header in order address the orchestration of traditional elements supporting SNMP V3 interface.
Figure 2B:
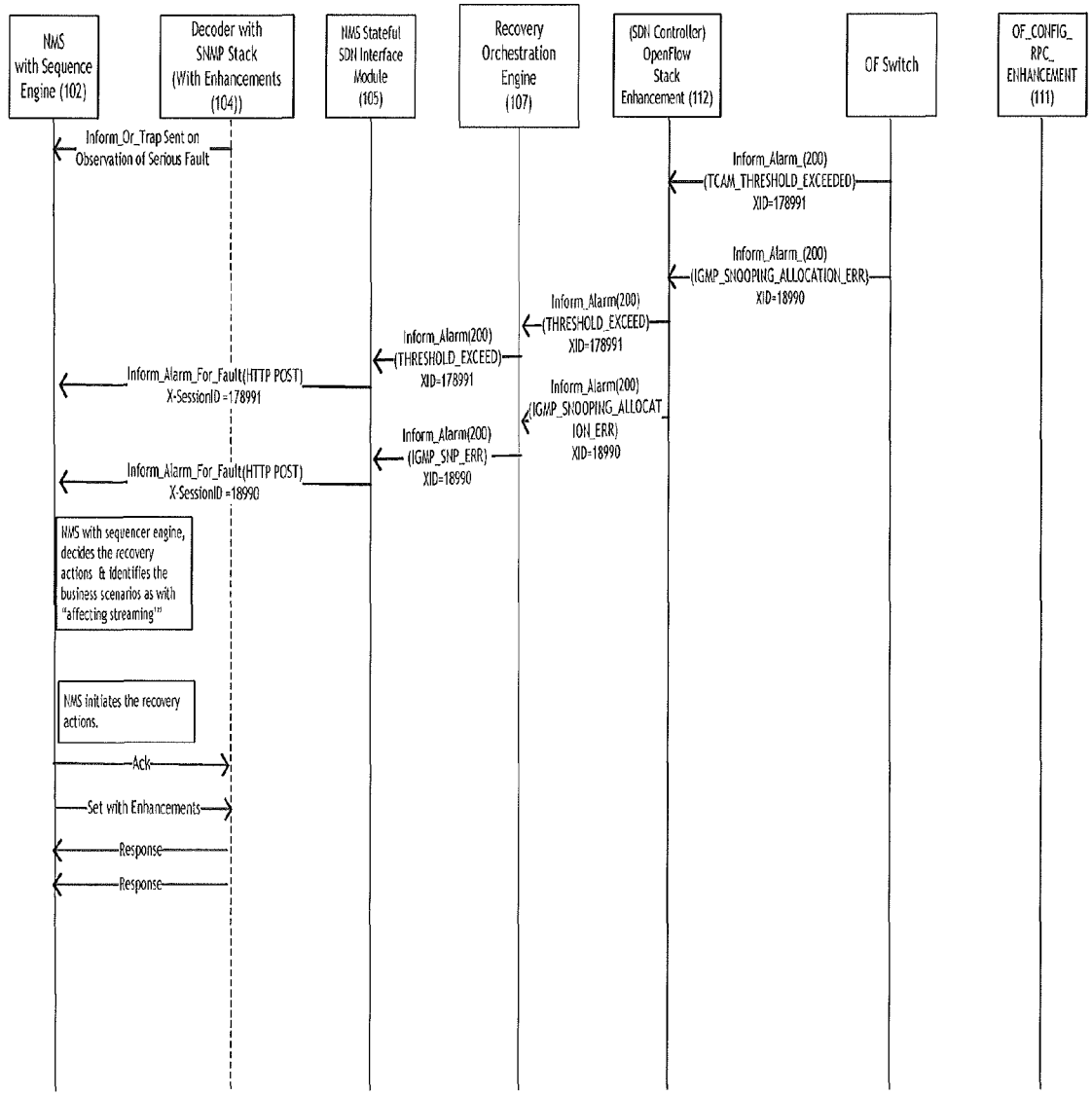
FIG. 2b illustrates the present invention with a sample use case-1 through a sequence diagram referring to example environment detailed in FIG. 2.
Figure 2C:
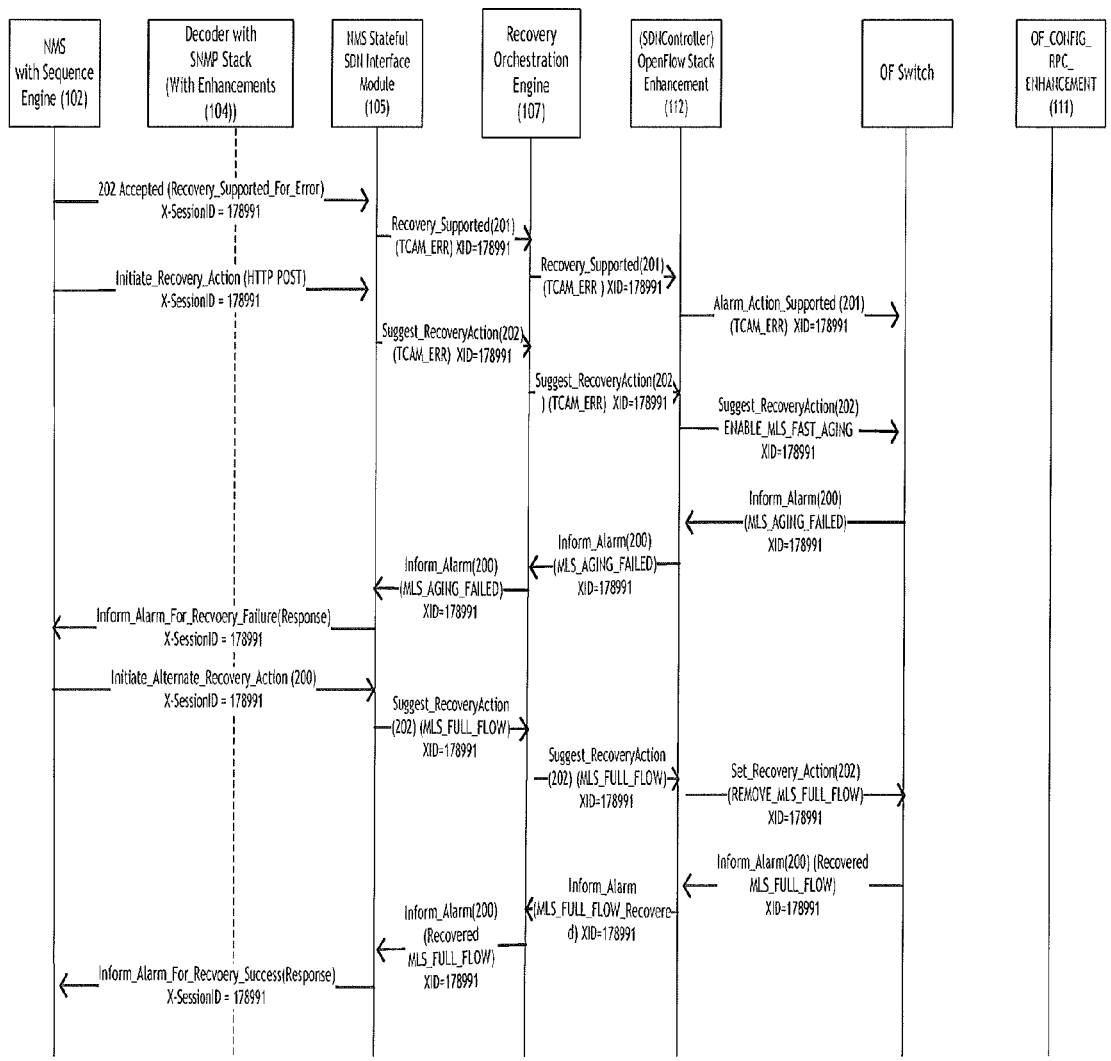
FIG. 2c illustrates the present invention with a sample use-2 case through a sequence diagram referring to example environment detailed in FIG. 2.
Figure 2D:
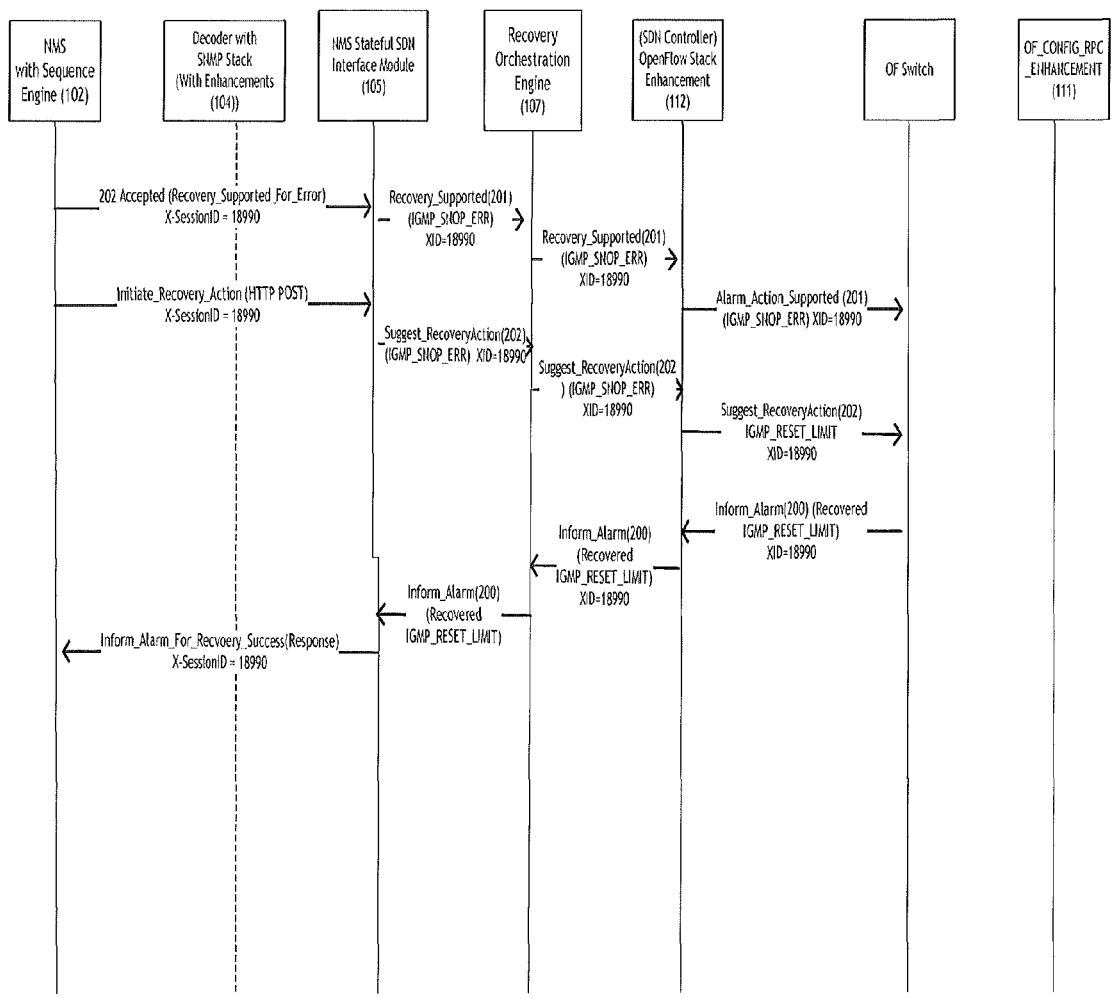
FIG. 2d illustrates the present invention with a sample use case-3 through a sequence diagram referring to example environment detailed in FIG. 2.
Figure 2E:
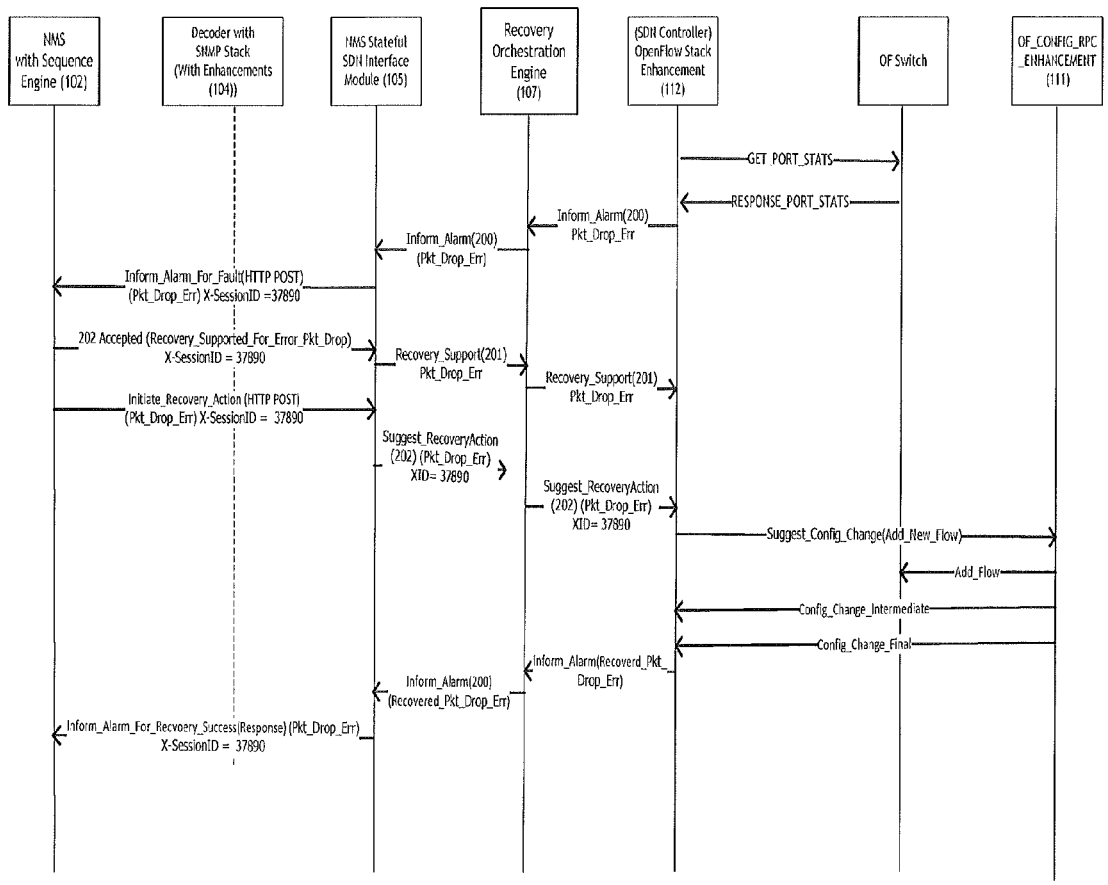
FIG. 2e illustrates the present invention with a sample use case-4 through a sequence diagram referring to example environment detailed in FIG. 2.

The Network Management system does a look up in the "Action Definition Repository" & determines the course of recommended action by constructing a "Request Identifier" as depicted in the FIG. 2a.

The "Request Identifier" thus Constructed in this manner is mapped as "xid" by the SDN controller & used in the Open Flow enhancements described above. The gist of the steps at the Northbound interface between the NMS & SDN Controller is given below:

---

============================================
============================
Start of Alarm Notification from Controller To NMS
============================================
============================
POST /informAlarm.html HTTP/1.1\r\n
============================================
============================
Acceptance of Alarm Notification from NMS to Controller
============================================
============================
HTTP/1.1 202 Accepted\r\n -continued

```
===============================================================
===============================
Initiation of Recovery Action Suggested by NMS to Controller
===============================================================
===============================
POST /setAction.html HTTP/1.1\r\n
===============================================================
===============================
Acceptance of Recovery Action from Controller to NMS
===============================================================
===============================
HTTP/1.1 202 Accepted\r\n
===============================================================
===============================
Status/Result of Recovery Action from Controller to NMS
===============================================================
===============================
POST /informAlarm.html HTTP/1.1\r\n
===============================================================
===============================
Final result of Recovery Action from Controller to NMS
===============================================================
===============================
POST /informAlarm.html HTTP/1.1\r\n
```

The SDN Controller looks at the request received from the SDN Interface module[105] in the Network Management System & breaks the higher level Abstraction into one or more Open Flow commands as suggested by the Recovery Orchestration Engine (107) indicated in FIG. 1.

The gist of the commands/steps at Open Flow end is given below:

```
OFPT_ALARM_STATUS = 200,
OFPT_SUPPORTED_RECOVERY_ACTION = 201,
OFPT_SET_RECOVERY_ACTION = 202,
OFPT_DEVICE_SUPPORT_ACTION = 203,
```

Since, each of the request can potentially result in multiple responses the Open Stack Agent running in the respective Elements may mark them as "MULTI PART RESPONSE" message as required. The intermediate responses for the request are communicated back to the stateful SDN Interface module which in turn conveys to the Network management System for granularly capturing the status.

Given below is the detailed use case for the following scenario. Let us say the following set of alarms is received by NMS from various elements referred in the above diagram.

Reception of alarm event "Continuity Error" as a Trap from the decoder

Detection of TCAM related error from the open flow switch

Detection IGMP snooping related error from the open flow switch

Detection of IGMP threshold increase by the STB resulting in an alarm to the Network Management system Packet dropped observed in Openflow enabled switch by the controller Based on the set of the errors received, the Network Management System maps the business scenario as "Affecting Streaming Service". The gist of recovery steps initiated for the respective devices/elements is given below.

1. Given the fact that the network would have both SNMP as well as Open flow based elements, let us assume that the decoder supports an SNMP V3 agent/interface. Based on fault received the NMS can instruct a set of recovery actions as follows.
2. Sets the recovery action for "resetting the decoder parameters"
3. Initiate the operational status of the decoder to "Active/Up" by bringing up the relevant interface
4. As a result of the TCAM alarm let us say NMS can instruct the controller to do the following.
    a) Enable MLS_FAST AGING with a threshold
    b) On above failure pls initiate alternate commend for flushing out the memory buffer
5. The Openflow switch responds to each of the above recovery action has intermediate set of results.
6. As a result of the IGMP snooping alarm let us say NMS can instruct the controller to do the following.
    a) Set Limit (IGMP_RESET_LIMIT)
7. The Open flow switch responds to each of the above recovery action.
8. Upon receiving packet drop related statistics the Controller based on a request the controller will instruct the Switch to do configuration changes as per rules identified.
    a) Initiate OF Config based transaction
9. The switch responds to the above recovery action by sending the set of results. The gist of the above steps in FIG. 2b,2c,2d,2e illustrates the above steps through a logical extension of the use cases to bring out the embodiments of the invention.

In another aspect, the present invention provides a method for enabling a SNMP based Network Management System in cooperation with a SDN Controller to control sequence of recovery actions and dynamically change the recovery action sequence based on the feedback received from an Agent/Open flow based devices across various systems/platforms for recovering a business service. The method is described in conjunction with system of FIG. 1.

The method includes provisioning of recovery action rules for the business service by a graphical interface module.

Further, the method includes looking up by a network management system in an Action Definition Repository for initiating recovery actions, wherein the action definition repository includes a list of recovery actions based on active updates from an agent module indicating the recovery actions supported during initialization.

Furthermore, the method includes initiating recovery actions by an action recovery sequencer engine.

Moreover, the method includes determining course of recommended action by the network management system by constructing a request identifier;

Characterized in that the method comprises mapping the request Identifier by SDN controller and using in the Open Flow enhancements Further, the method comprises looking up by the SDN Controller at the request received from Network Management System and breaking higher level abstraction into one or more open flow commands as suggested by the recovery orchestration engine.

Furthermore, the method comprises generating at least one response by the open stack agents.

Thereafter, the method comprises communicating at least one response received from the open stack agent running back to the stateful SDN Interface Module.

Finally, the method includes conveying the at least one response by the stateful SDN Interface Module to the network management system through northbound interface for granularly capturing the status.

The method further includes adding an explicit co-relation ID to the NETCONFIG/OF-CONFIG RPC mechanism for easy managing of the end to end recovery actions.

Specifically, the open flow enabled elements communicate a list of supported recovery actions as a part of initialization mechanism.

More specifically, end to end recovery actions are initiated and performed from a Network Management System to at least one SDN Controllers, Element Management Systems and devices across SNMPV3, NETCONF, OF-CONFIG and OPEN FLOW based elements through a programmatic manner.

Referring now to FIG. 3, there is shown an integrated SDN controller for directly correlating and controlling sequence of recovery actions to be performed based on the fault received and dynamically change the recovery action sequence of the fault, in accordance with an embodiment of the present invention. The integrated SDN controller includes an user interface (301), wherein the user interface is GUI based rule definition enablement interface.

Further, the SDN controller includes an action recovery sequencer engine (302) capable of initiating recovery actions.

Furthermore, the SDN controller includes an action definition repository (303) capable of storing of recovery actions in interaction with the action recovery sequence engine (302) and facilitating configuration of rules for the business service, wherein the action definition repository (303) includes a list of recovery actions based on active updates from an agent module indicating the recovery actions supported during initialization.

Moreover, the SDN controller includes a recovery orchestration engine (307) for enabling orchestration of atomic recovery actions by actively interacting with any one of predefined Open flow stack enhancements (312) and predefined OF-CONFIG enhancements (310), wherein the open flow stack enhancements (312) and OF-CONFIG enhancements (310) at the SDN controller enables element/device interaction with an open flow based elements stack enhancements (313) and OF-CONFIG enhancements (311) at the device/element end.

Furthermore the SDN Controller includes an Analytics and data mining engine (314) in the SDN controller for effectively interpreting the data received in real time from the devices & performingreal time updates to the Topology & Multi TenantManager and Recovery Orchestration Engine (307). The Recovery Orchestration Engine (307) would decide the final actions based on both provisioned as well as dynamic real time analytics feed received from the Analytics and Data Mining Engine (314). This essentially implies that application of the rules for recovery actions could change based on real time analytics updates received through data mining and analytics engine.

The SDN controller also includes a unified asynchronous notification handler (308) capable of enabling alarms/errors to be sent to the North bound systems.

It is important to also note that, as the SDN Controller ultimately evolves into a full-fledged Network management Solution capable of performing recovery actions for business service based on fault detected, some of the building blocks highlighted as a part of NMS in FIG. 1(Refer numbered items 101, 102 & 103) shall be realized in the SDN Controller.

FIG. 4 is an extension of FIG. 3 to bring out the key elements involved for both traditional SNMP based network as well as Software Defined Networks.

Based on FIG. 4 it may be noted that the Network Management system which typically is integrated with element management system & various devices supports typical interfaces such as SNMP/NETCONF. Given the fact that some of the elements supporting SNMP may not become SDN enabled the NMS is expected to interact with the SDN Controller & devices to orchestrate the recovery actions.

FIG. 5 illustrates the initialization steps for the open flow elements

The initialization steps are elaborated in the use case. As can be interpreted the open flow based elements communicate to indicate the actions supported based on the proposed open flow enhancements to enable the SDN Controller to build the repository of actions supported. These commands could be sent by the Controller to the Network Management System through the North Bound interface as well, so that the NMS has a view of recovery instructions that are supported.

The following section illustrates the North bound interface definitions pertaining to the initialization steps initiated by the Open flow based elements. The devices communicate the recovery actions supported as a part of initialization to the SDN Controller based on the proposed open flow enhancements. The Northbound Interface from SDN controller which is currently not defined is enhanced to reflect the initialization steps as a part of Interface definition as described below.

```
================================================================
Initialization of Supported Recovery Actions Supported Config from Controller to NMS
================================================================
POST /informAlarm.html HTTP/1.1\r\n
Request Method: POST
Request URI: /informAlarm.html
Request Version: HTTP/1.1
Host: www.controller.com\r\n
origin : www.switch.com
User-Agent: Controller/1.4 \r\n
Accept: application/json\r\n
  Accept-Language: en-us,en;q=0.5\r\n
  Accept-Encoding: gzip,deflate\r\n
  Accept-Charset: ISO-8859-1,utf-8;q=0.7,*;q=0.7\r\n
  Keep-Alive: 300\r\n
  Connection: keep-alive\r\n
    X-MultiResponse : False \r\n
    X-SessionID : NULL \r\n
    {
           OFHeader: {
                     Version:1.4,
                     Type:203,          //Openflowextention
```

```
                                             Desc: "Device Supported Recovery Actions"
                          },
         OFPayload: {
                                             Action : 3, //TCAM ReInit
                                             Action : 4, //TCAM ReSetBuffer
                                             Action : 5, //IP Conf
                                             Action : 6, //Packet Loss in Streaming
                                             Action : 7, //Jitter Buffer
                                             .
                                             .
                                             .
                                             .
                          }
     }
     ===========================================================
     Acceptance of Initialization of Recovery Actions Supported from NMS to Controller
     ===========================================================
HTTP/1.1 202 Accepted\r\n
Request Version: HTTP/1.1
Status Code: 202
Response Phrase: Accepted
  Date: Thu, 13 May 2004 10:17:12 GMT\r\n
  Server: Apache\r\n
  Last-Modified: Tue, 20 Apr 2004 13:17:00 GMT\r\n
ETag: "9a01a-4696-7e354b00"\r\n
  Accept-Ranges: bytes\r\n
  Content-Length: <someLength>\r\n
  Connection: Keep-Alive\r\n
  Content-Type: application/json\r\n
      X-MultiResponse : False \r\n
      X-SessionID : NULL \r\n
      {
                OFHeader: {
                                       Version:1.4,
                                       Type:201,                // Acknowledged
                                       Desc: "Ack"
                             },
                OFPayload: {
                             }
      }
```

It may also be noted that changes suggested on the open flow with respect to performing recovery actions with a view to bring up the business service can also be applied in a SDN(Open Flow) only environment comprising of multiple controllers as the controllers as per definition support open flow as per standard which can be leveraged & used for also performing recovery of services by interacting among with controllers through the proposed minimum enhancements as outlined in the Invention for carrying out the recovery actions based on the received faults.

ADVANTAGES OF THE INVENTION

The technical advancements of the system envisaged by the present invention include the realization of:

The system and method of the present invention supports a Recovery Action Sequencer Engine as part of the Network Management System OR as a part of SDN Controller for dynamically controlling the sequence of recovery actions for the business services;

The system and method of the present invention is focused on improving the fault response & recovery times in an automatic manner for the business service for traditional & Software Defined Networks in addition to the traditional coverage on monitoring the platforms, systems & devices.

The system and method that provides a flexible way to create a rule based recovery definition;

A system and method for applying the rules for recovery actions based on real time analytics updates received through data mining and analytics engine The present invention provides a secure system to invoke the recovery actions in a managed manner for both traditional SNMP as well as Open Flow based Software Defined Networks A system and method supports seamless integration with existing Network Management tools, service assurance & test tools for performing recovery actions A system and method provides a graphical interface for rule definition & logging the outcome of recovery actions for the business services.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps. The use of the expression "at least" or "at least one" suggests the use of one or more elements or ingredients or quantities, as the use may be in the embodiment of the invention to achieve one or more of the desired objects or results.

The numerical values mentioned for the various physical parameters, dimensions or quantities are only approximations and it is envisaged that the values higher/lower than the numerical values assigned to the parameters, dimensions or quantities fall within the scope of the invention, unless there is a statement in the specification specific to the contrary.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A system for enabling a SNMP based Network Management System in cooperation with at least one SDN Controller to control sequence of recovery actions and dynamically change the recovery action sequence based on the feedback received from an Agent/Open flow based devices across various systems/platforms for recovering a business service, the system comprising a network management system (NMS), the network management system (NMS) having a graphical interface module for provisioning of recovery action rules for the business service, an action recovery sequencer engine capable of initiating recovery actions, an action definition repository capable of storing of recovery actions in interaction with the action recovery sequence engine and facilitating configuration of rules for the business service, wherein the action definition repository includes a list of recovery actions based on active updates from an agent module indicating the recovery actions supported during initialization, the system comprising:
   a stateful SDN Interface module configured within the Network Management System for initiating and performing a list of recovery actions on behalf of the Network Management system; and
   at least one a software defined network (SDN) controller capable of receiving list of recovery action from the stateful SDN Interface Module based on a fault detected, the software defined network (SDN) having,
   an action mapper functional module for enabling the SDN Controller to keep a logical correlation of actions initiated from the Network Management System,
   a recovery orchestration engine capable of receiving logical correlation of actions from the action mapper functional module and enabling orchestration of atomic recovery actions by actively interacting with predefined Open flow stack enhancements and predefined OF-CONFIG enhancements, wherein the open flow stack enhancements and OF-CONFIG enhancements at the SDN controller enables element/device interaction with an open flow based elements stack enhancements and OF-CONFIG enhancements at the device/element end,
   an unified asynchronous notification handler capable of enabling alarms/errors to be sent to the North bound systems through the stateful SDN Interface Module at the Network Management System, and
   an analytics and Data mining Engine to analyze the data received from various devices/platforms/systems and also send real time notifications to the Recovery Orchestration Engine.

2. The system as claimed in claim 1, wherein the software defined network (SDN) controller optionally includes a REST based interface for providing notifications.

3. The system as claimed in claim 1, wherein the open flow enabled elements communicate a list of supported recovery actions as a part of initialization mechanism.

4. The system as claimed in claim 1, wherein predefined Open flow stack enhancements for initiating and performing the end to end recovery actions for a given fault comprises:
   a new message type for indicating the alarm information,
   a new message type for indicating recovery support,
   a new message type for initiating recovery action,
   a new message type for initializing recovery action,
   inclusion of set of recovery action map,
   a first set of additional structure for detecting faults,
   a second set of additional structure for acknowledging the faults, and combination thereof.

5. The system as claimed in claim 1, wherein end to end recovery actions are initiated and performed from the Network Management System to at least one SDN Controllers, Element Management Systems and devices across SNMPV3, NETCONF, OF-CONFIG and OPEN FLOW based elements through a programmatic manner.

6. The system as claimed in claim 1, wherein the Analytics and Data mining engine sends real time notifications to the Recovery Orchestration Engine and the Recovery Orchestration engine upon receiving the real time analytics feed applies/changes the provisioned recovery action sequence as appropriate.

7. A method for enabling a SNMP based Network Management System in cooperation with a SDN Controller to control sequence of recovery actions and dynamically change the recovery action sequence based on the feedback received from an Agent/Open flow based devices across various systems/platforms for recovering a business service, the method comprising:
   provisioning of recovery action rules for the business service by a graphical interface module;
   looking up by a network management system in an Action Definition Repository for initiating recovery actions, wherein the action definition repository includes a list of recovery actions based on active updates from an agent module indicating the recovery actions supported during initialization;
   initiating recovery actions by an action recovery sequencer engine;
   determining course of recommended action by the network management system by constructing a request identifier,
   the method comprising:
   mapping the request Identifier by SDN controller and using in the Open Flow enhancements;
   looking up by the SDN Controller at the request received from Network Management System and breaking higher level abstraction into one or more open flow commands as suggested by the recovery orchestration engine;
   generating at least one response by the open stack agents;
   communicating at least one response received from the open stack agent running back to the stateful SDN Interface Module;
   conveying the at least one response by the stateful SDN Interface Module to the network management system through northbound interface for granularly capturing the status; and
   analyzing the received data by an Analytics and Data Mining Engine and further asynchronously notifying the Recovery Orchestration Engine of real time updates.

8. The method as claimed in claim 7, wherein the open flow enabled elements communicate a list of supported recovery actions as a part of initialization mechanism.

9. The method as claimed in claim 7, wherein end to end recovery actions are initiated and performed from a Network Management System to at least one SDN Controllers, Element Management Systems and devices across SNMPV3, NETCONF, OF-CONFIG and OPEN FLOW based elements through a programmatic manner.

10. The method as claimed in claim 7, further comprising adding a co-relation ID to the NETCONFIG or OF-CONFIG remote procedure call mechanism for easy managing of the end to end recovery actions.

11. The method as claimed in claim 7, further comprising of receiving the real time updates as feedback from Analytics and Data Engine which would essentially be important data points affecting the operational network and use these feedbacks to change the ongoing recovery action sequence as appropriate by the Recovery Orchestration Engine.

12. A SDN controller (without a separate SNMP based Network Management System) configured for directly correlating and controlling sequence of recovery actions to be performed on Telecommunication network Equipment based on the fault received and dynamically change the recovery action sequence of the fault, the SDN controller comprising:

an user interface, wherein the user interface is GUI based rule definition enablement interface;

an action recovery sequencer engine capable of initiating recovery actions, an action definition repository capable of storing of recovery actions in interaction with the action recovery sequence engine and facilitating configuration of rules for the business service, wherein the action definition repository includes a list of recovery actions based on active updates from an agent module indicating the recovery actions supported during initialization; and a recovery orchestration engine for enabling orchestration of atomic recovery actions by actively interacting with any one of predefined Open flow stack enhancements and predefined OF-CONFIG enhancements, wherein the open flow stack enhancements and OF-CONFIG enhancements at the SDN controller enables element/device interaction with an open flow based elements stack enhancements and OF-CONFIG enhancements at the device/element end, an unified asynchronous notification handler capable of enabling alarms/errors to be sent to the North bound systems, an analytics and Data mining Engine to analyze the data received from various devices/platforms/systems and also send real time notifications to the Recovery Orchestration Engine.

13. The system as claimed in claim 12, wherein the software defined network (SDN) controller optionally includes a REST based interface for providing notifications.

* * * * *